US006942072B2

(12) United States Patent
Klode et al.

(10) Patent No.: US 6,942,072 B2
(45) Date of Patent: Sep. 13, 2005

(54) MOTOR ASSEMBLY SUCH AS AN ELECTRO-MECHANICAL-BRAKE MOTOR ASSEMBLY

(75) Inventors: Harald Klode, Centerville, OH (US); John B. Hageman, Vandalia, OH (US); Paul Rymoff, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 136 days.

(21) Appl. No.: 10/341,171

(22) Filed: Jan. 13, 2003

(65) Prior Publication Data

US 2004/0055835 A1 Mar. 25, 2004

Related U.S. Application Data

(60) Provisional application No. 60/413,245, filed on Sep. 24, 2002.

(51) Int. Cl.[7] .................................................. B60L 7/00
(52) U.S. Cl. ......................... 188/164; 188/72.1; 310/88
(58) Field of Search ................................ 188/156–162; 335/233, 253, 254; 310/77

(56) References Cited

U.S. PATENT DOCUMENTS 3,659,686 A * 5/1972 Markley ...................... 477/23
6,315,092 B1 * 11/2001 Schwarz ..................... 188/265
6,407,528 B1 6/2002 Disser et al.
6,411,061 B1 6/2002 Disser et al.
6,435,320 B1 * 8/2002 Drennen et al. ............ 188/164
6,561,321 B1 * 5/2003 Klode et al. ............... 188/72.1
6,642,636 B2 11/2003 Enzinna

* cited by examiner

*Primary Examiner*—Matthew C. Graham
(74) *Attorney, Agent, or Firm*—Michael D. Smith

(57) ABSTRACT

A motor assembly, such as an electro-mechanical-brake (EMB) motor assembly includes an electric motor, a latch gear, a solenoid, and a spring. The latch gear is non-rotatably attached to the drive shaft of the motor. The spring is operatively connected to the solenoid and has a spring projection which is longitudinally-deflectable by energizing the solenoid. The gear tooth is shaped to longitudinally retain the spring projection when the latch gear rotates the gear tooth into engagement with the longitudinally-deflected spring projection. In one example, the latch gear is a parking-brake latch gear and the motor assembly provides a parking brake function for an EMB electric motor which also is used for applying and releasing a vehicle's driving brakes.

16 Claims, 4 Drawing Sheets

MOTOR ASSEMBLY SUCH AS AN ELECTRO-MECHANICAL-BRAKE MOTOR ASSEMBLY

CROSS REFERENCE TO RELATED APPLICATIONS

The present application claims priority of U.S. Provisional Application No. 60/413,245 filed Sep. 24, 2002.

This invention was made in the performance of a Cooperative Research and Development Agreement with the Department of the Air Force. The Government of the United States has certain rights to use the invention.

TECHNICAL FIELD

The present invention relates generally to motors, and more particularly to a motor assembly having an electric motor.

BACKGROUND OF THE INVENTION

Motors includes electro-mechanical-brake (EMB) motors used to power electro mechanical brakes. Conventional electro mechanical brakes, also known as electric brake calipers, utilize an EMB electric motor positioned relative to the caliper housing to drive (through intervening planetary or other gears which act as a force multiplier) an inline rotatable ballscrew of a ballscrew subassembly positioned within the caliper housing. The rotating ballscrew linearly moves a ballnut of the ballscrew subassembly. The ballnut is connected to, and linearly moves, an inner brake pad against a brake rotor of a vehicle. An outer brake pad, mounted to the caliper housing, is positioned on an opposite side of the brake rotor. Therefore, during braking, the inner brake pad will be forced against the rotor and a resulting reactionary force will pull the outer brake pad into engagement with the opposite side of the rotor. Engagement of the inner and outer brake pads with the rotor will slow and stop the vehicle or hold a stopped vehicle in a fixed position. To set the brake as a parking brake, a separate electric motor is used to move a locking mechanism into engagement with a latch gear attached to the drive shaft of the EMB electric motor.

What is needed is an improved motor assembly such as an improved EMB motor assembly.

SUMMARY OF THE INVENTION

A first expression of an embodiment of the invention is for an electro-mechanical-brake (EMB) motor assembly and includes an EMB electric motor, a parking-brake latch gear, a solenoid, and a spring. The EMB electric motor has a drive shaft with a longitudinal axis. The parking-brake latch gear is non-rotatably attached to the drive shaft and has a longitudinally extending gear tooth having a notch facing in a circumferential direction. The spring is operatively connected to the solenoid and has a spring projection which is longitudinally-deflectable against the parking-brake latch gear by energizing the solenoid and which thereafter is retainable in the notch of the gear tooth of the parking-brake latch gear by rotating the parking-brake latch gear to receive the longitudinally-deflected spring projection in the notch.

A second expression of an embodiment of the invention is for a motor assembly and is identical with the above-described first expression for an EMB motor assembly except that the electric motor of the second expression is not limited to an EMB electric motor and the latch gear of the second expression is not limited to a parking-brake latch gear.

A third expression of an embodiment of the invention is for an electro-mechanical-brake (EMB) motor assembly and includes an EMB electric motor, a parking-brake latch gear, a solenoid, and a spring. The EMB electric motor has a drive shaft with a longitudinal axis. The EMB electric motor is rotatable in a brake-setting forward direction and is rotatable in a brake-releasing reverse direction. The parking-brake latch gear is non-rotatably attached to the drive shaft and has a gear tooth. The spring operatively is connected to the solenoid and has a spring projection longitudinally-deflectable by energizing the solenoid. The gear tooth is positioned and shaped to longitudinally retain the spring projection when the spring projection is longitudinally deflected against the parking-brake latch gear by energizing the solenoid and when thereafter the drive shaft is rotated in the reverse direction rotating the gear tooth against the longitudinally-deflected spring projection. The gear tooth longitudinally holds the longitudinally-retained spring projection when the solenoid and the EMB electric motor are deenergized. The gear tooth is shaped to longitudinally release the longitudinally-retained spring projection to a non-deflected state with the solenoid deenergized when the drive shaft is rotated in the forward direction rotating the gear tooth away from the longitudinally-deflected spring projection.

A fourth expression of an embodiment of the invention is for a motor assembly and is identical with the above-described third expression for an EMB motor assembly except that the electric motor of the second expression is not limited to an EMB electric motor and the latch gear of the second expression is not limited to a parking-brake latch gear.

Several benefits and advantages are derived from one or more of the expressions of an embodiment of the invention. Having a solenoid actuated latch gear eliminates the additional electric motor used to set the parking brake in conventional EMB motor assemblies.

DESCRIPTION OF THE PREFERRED EMBODIMENTS

Figure 1:
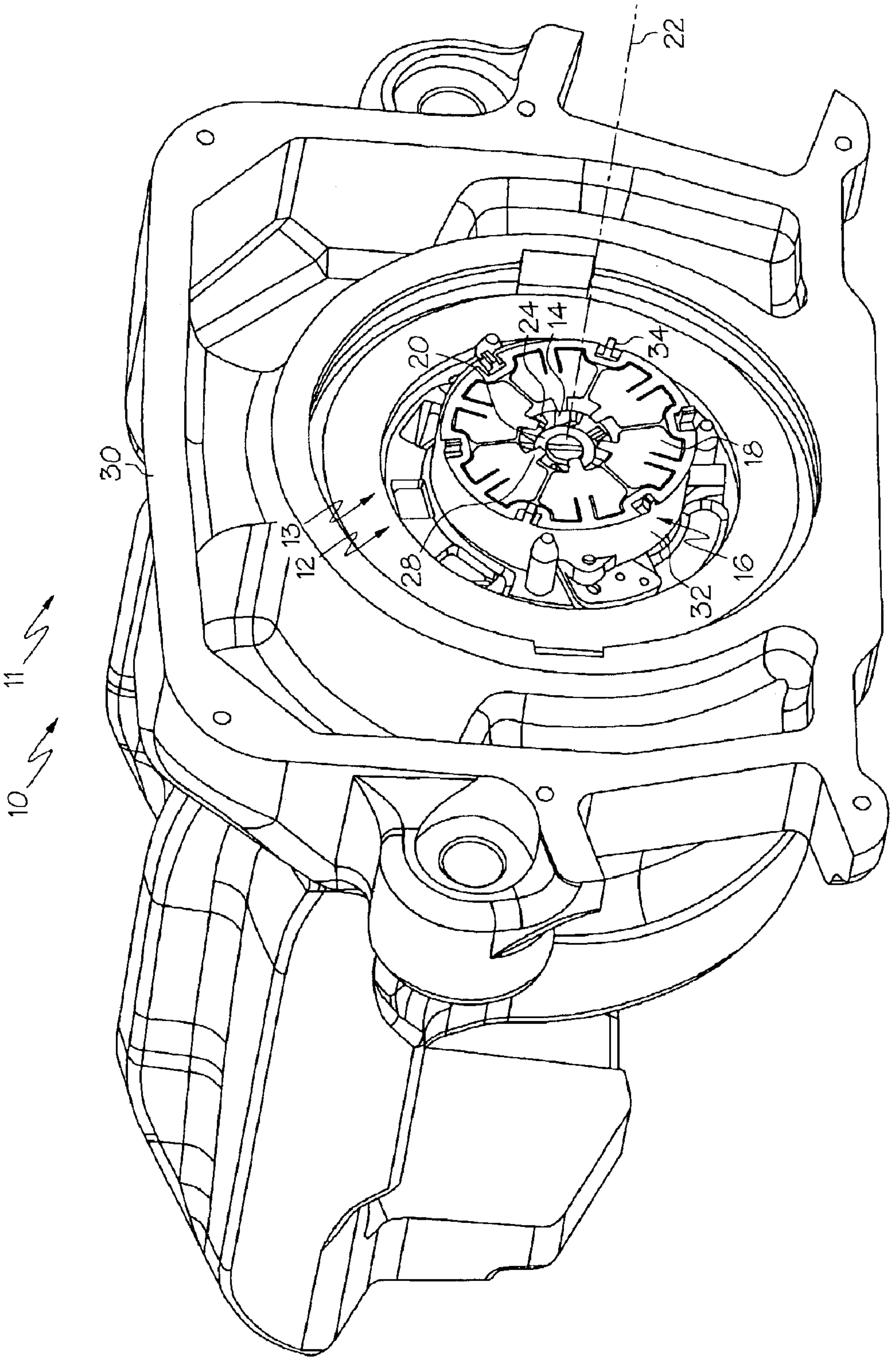
FIG. 1 is a perspective view of an embodiment of a motor assembly of the invention in the form of an EMB motor assembly with the cover of the solenoid housing removed exposing the spring.
Figure 2:
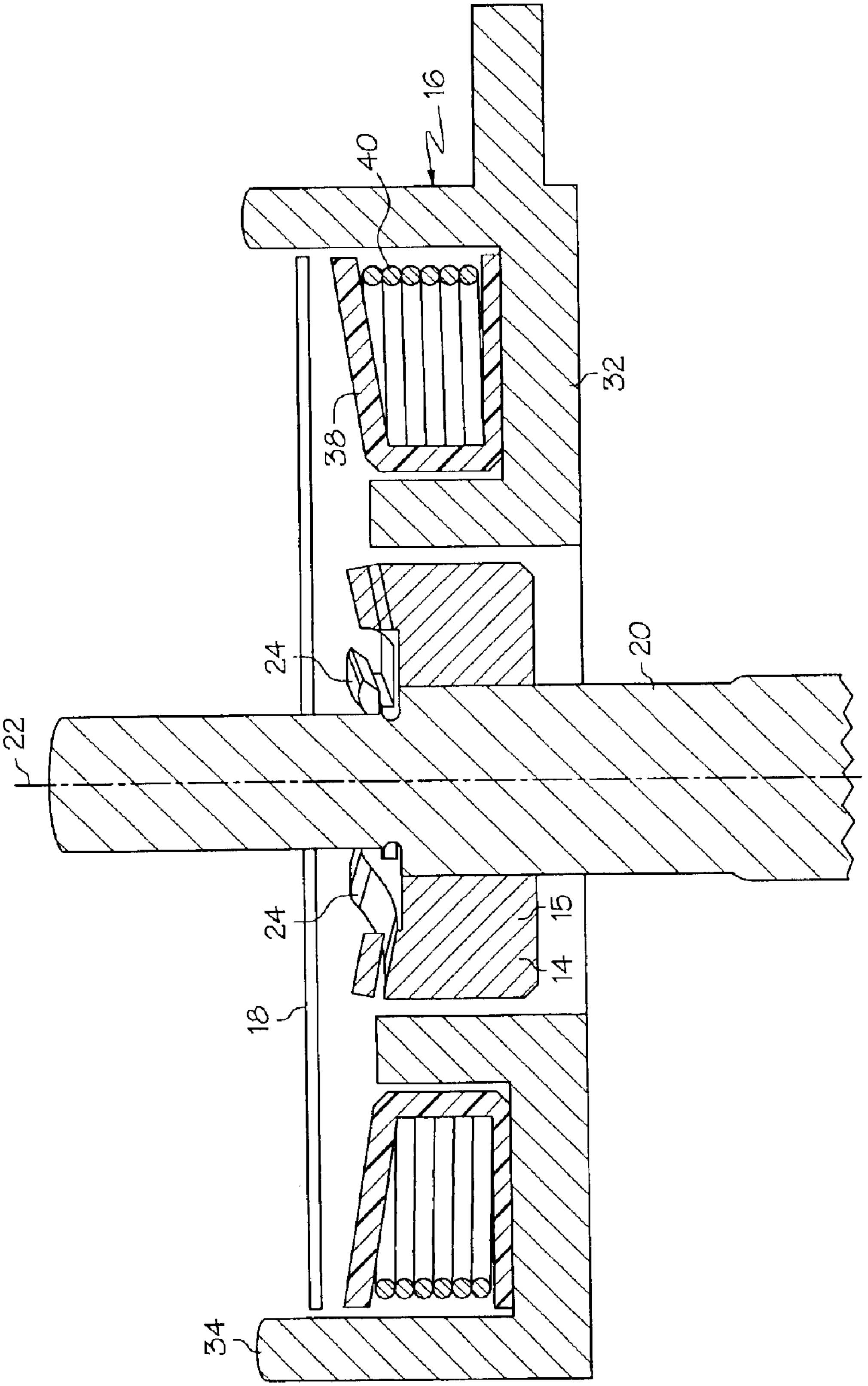
FIG. 2 is a cross sectional view taken through the solenoid housing of FIG. 1.

Referring now to the drawings, FIGS. 1–6 illustrate an embodiment of the present invention. A first expression of the embodiment shown in FIGS. 1–6 is for an electro-mechanical-brake (EMB) motor assembly 10 including an EMB electric motor 12, a parking-brake latch gear 14, a solenoid 16, and a spring 18. The EMB electric motor 12 includes a drive shaft 20 with a longitudinal axis 22. The parking-brake latch gear 14 is non-rotatably attached to the drive shaft 20 and has a longitudinally extending gear tooth 24 having a notch 26 facing in a circumferential direction. The spring 18 is operatively connected to the solenoid 16 and has a spring projection 28 which is longitudinally-deflectable against the parking-brake latch gear 14 by energizing the solenoid 16 and which thereafter is retainable in the notch 26 of the gear tooth 24 of the parking-brake latch gear 14 by rotating the parking-brake latch gear 14 to receive the longitudinally-deflected spring projection 28 in the notch 26.

In one example of the first expression of the embodiment of FIGS. 1–6, the spring 18 has a substantially annular disk shape. In this example, the spring 18 is coaxially aligned with the drive shaft 20, In one variation, the spring projection 28 is one of a plurality of substantially-identical spring projections 28 of the spring 18, and the gear tooth 24 is one of a plurality of substantially-identical gear teeth 24 of the parking-brake latch gear 14. In one modification, the spring projections 28 are radially-inwardly-facing spring projections 28, and the notches 26 face in the same circumferential direction. In one arrangement, the number of spring projections 28 is equal to the number of gear teeth 24.

In the same or a different example of the first expression of the embodiment of FIGS. 1–6, the EMB electric motor 12 includes a motor housing 30 supporting the EMB electric motor 12, and the solenoid 16 includes a solenoid housing 32 non-rotatably attached to the motor housing 30. In one variation, the solenoid housing 32 includes a plurality of tangs 34, the spring 18 includes a plurality of outer-circumferential cutouts 36, and the tangs 34 are disposed in the cutouts 36 preventing rotation of the spring 18. In one design, the solenoid housing 32 and the parking-brake latch gear 14 are substantially coaxially aligned with the longitudinal axis 22, and the solenoid housing 32 circumferentially surrounds the parking-brake latch gear 14. In this design, the solenoid 16 includes a bobbin 38 containing a wound electric coil 40, wherein the bobbin 38 is substantially coaxially aligned with the longitudinal axis 22 and circumferentially surrounds the parking-brake latch gear 14. In one modification of this design, the tangs 34 longitudinally extend from a longitudinal end of the solenoid housing 32, the spring 18 abuts the longitudinal end of the solenoid housing 32 with the tangs 34 engaged in the cutouts 36, and a solenoid-housing cover (not shown) covers the spring 18.

Figure 3:
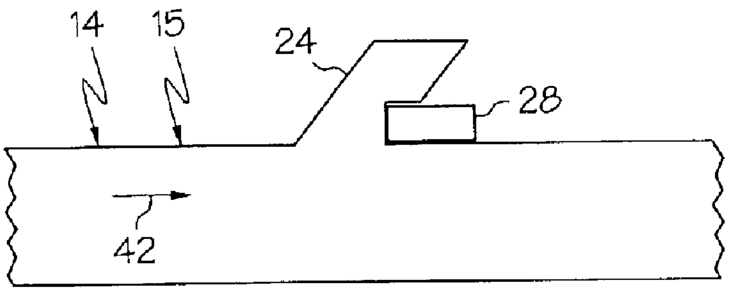
FIG. 3 is a schematic edgewise view of a portion of the parking-brake latch gear including one gear tooth and of the edge only of one spring projection of the spring of FIGS. 1–2 showing the parking-brake set mode as seen looking radially outward from the longitudinal axis.

In one example of the operation of the embodiment of the EMB motor assembly 10 of FIGS. 1–6, a vehicle driver applies the foot brake (not shown) to slow and stop the vehicle by energizing the EMB electric motor 12 to rotate in a forward rotational (e.g., counterclockwise) direction also called a forward direction. The operation of EMB brake systems, including their EMB electric motors and their planetary or other gears, ballscrew or other assemblies and brake pads, to slow and stop a vehicle is well known, does not form a part of the invention, and is not otherwise explained herein. With the foot brake released or still applied, the driver pushes the parking-brake button (not shown) on the dashboard. Referring to FIG. 3 and through appropriate logic circuits, pushing the parking-brake button energizes the solenoid 16 which longitudinally deflects the spring projection 28 against the parking-brake latch gear 14 and thereafter deenergizes the EMB electric motor 12 which then rotates (due to the back-drive force of the applied brakes) the parking-brake latch gear 14 in a reverse rotational (e.g., clockwise) direction (indicated by arrow 42 in FIG. 3) also called a reverse direction so that the notch 26 of the gear tooth 24 receives into engagement the longitudinally-deflected spring projection 28. Then, the solenoid 16 is also deenergized. The relatively small anti-rotational force of the spring projection 28 is sufficient to counteract the back-drive rotational force applied to the gear tooth 24 of the parking-brake latch gear 14 by the EMB electric motor in its parking-brake set mode because of the force multiplier of the intervening planetary gears (not shown) as can be appreciated by those skilled in the art.

Figure 4:
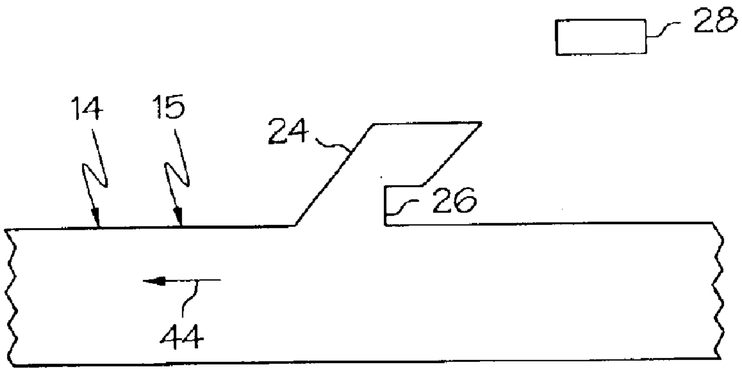
FIG. 4 is a view, as in FIG. 3, but showing the parking-brake release mode.
Figure 5:
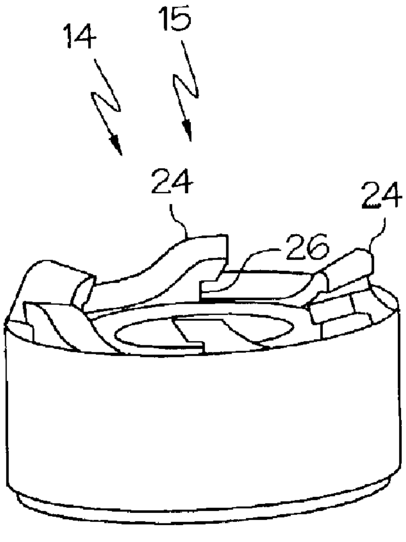
FIG. 5 is a perspective view of the parking-brake latch gear of FIGS. 1–2.
Figure 6:
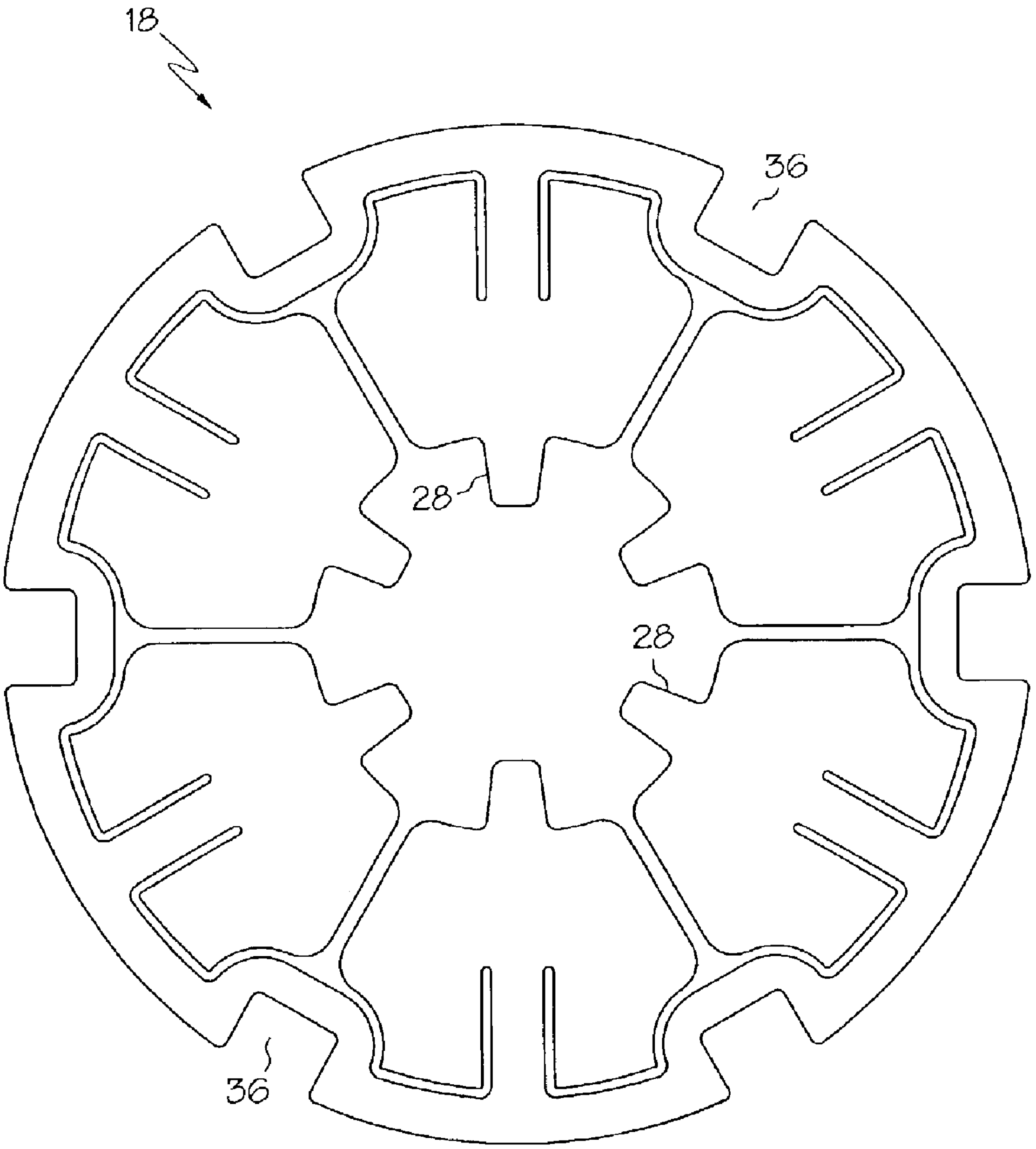
FIG. 6 is a planar view of the spring of FIGS. 1–2.

Continuing with this operational example and referring to FIG. 4, when the driver pushes the parking-brake button again (or pushing another button), the EMB electric motor 12 is energized to rotate in the forward rotational direction (indicated by arrow 44), which applies the brakes harder, to rotate the parking-brake latch gear 14 and its gear tooth 24 and notch 26 out of engagement with the spring projection 28. As the solenoid 16 has remained deenergized since setting the parking brake, the spring projection 28 returns to its non-deflected state releasing the parking brake. Thereafter, the EMB electric motor 12 is deenergized awaiting further energizing by the foot brake or by another application of the parking brake. As can be appreciated by the artisan, the same EMB electric motor is used to move the same brake pad when the driver uses the foot brake to slow and stop the vehicle and when the driver pushes the parking-brake button to set or release the parking brake. Other examples of operating the EMB motor assembly 10, including those which energize (instead of relying on the back-drive force) the EMB electric motor to rotate in the reverse direction to latch the spring projection in the notch of the gear tooth, are left to the artisan.

A second expression of the embodiment shown in of FIGS. 1–6 is for a motor assembly 11 including an electric motor 13, a latch gear 15, a solenoid 16, and a spring 18. The electric motor 13 includes a drive shaft 20 with a longitudinal axis 22. The latch gear 15 is non-rotatably attached to the drive shaft 20 and has a longitudinally extending gear tooth 24 having a notch 26 facing in a circumferential direction. The spring 18 is operatively connected to the solenoid 16 and has a spring projection 28 which is longitudinally-deflectable against the latch gear 14 by energizing the solenoid 16 and which thereafter is retainable in the notch 26 of the gear tooth 24 of the latch gear 14 by rotating the latch gear 14 to receive the longitudinally-deflected spring projection 28 in the notch 26.

In one example of the second expression of the embodiment of FIGS. 1–6, the spring 18 has a substantially annular disk shape, In this example, the spring 18 is coaxially aligned with the drive shaft 20, In one variation, the spring projection 28 is one of a plurality of substantially-identical spring projections 28 of the spring 18, and the gear tooth 24 is one of a plurality of substantially-identical gear teeth 24 of the parking-brake latch gear 14. It is noted that any of the examples, variations, designs, modifications, of the first expression of the embodiment of FIGS. 1–6 are equally applicable to the second expression without the limitations of the electric motor 13 of the second expression having to be an EMB electric motor 12 and the latch gear 15 having to be a parking-brake latch gear 14.

A third expression of the embodiment shown in FIGS. 1–6 is for an electro-mechanical-brake (EMB) motor assembly 10 including an EMB electric motor 12, a parking-brake latch gear 14, a solenoid 16, and a spring 18. The EMB electric motor 12 includes a drive shaft 20 with a longitudinal axis 22. The EMB electric motor 12 is rotatable in a brake-setting forward direction (which is counterclockwise as seen in FIG. 1 and which is arrow 44 in FIG. 4) and is rotatable in a brake-releasing reverse direction (which is clockwise as seen in FIG. 1 and which is arrow 42 in FIG. 3). The parking-brake latch gear 14 is non-rotatably attached to the drive shaft 20 and has a gear tooth 24. The spring 18 is operatively connected to the solenoid 16 and has a spring projection 28 longitudinally-deflectable by energizing the solenoid 16. The gear tooth 24 is disposed and shaped to longitudinally retain the spring projection 28 when the spring projection 28 is longitudinally deflected against the parking-brake latch gear 14 by energizing the solenoid 16 and when thereafter the drive shaft 20 is rotated in the reverse direction rotating the gear tooth 24 against the longitudinally-deflected spring projection 28. The gear tooth 24 longitudinally holds the longitudinally-retained spring projection 28 when the solenoid 18 and the EMB electric motor 12 are deenergized. The gear tooth 24 is shaped to longitudinally release the longitudinally-retained spring projection 28 to a non-deflected state with the solenoid 16 deenergized when the drive shaft 20 is rotated in the forward direction rotating the gear tooth 24 away from the longitudinally-deflected spring projection 28. It is noted that any of the examples, variations, designs, modifications, of the first expression of the embodiment of FIGS. 1–6 are equally applicable to the third expression.

A fourth expression of the embodiment shown in FIGS. 1–6 is for a motor assembly 11 including an electric motor 13, a latch gear 15, a solenoid 16, and a spring 18. The electric motor 13 includes a drive shaft 20 with a longitudinal axis 22. The latch gear 15 is non-rotatably attached to the drive shaft 20 and has a gear tooth 24. The spring 18 is operatively connected to the solenoid 16 and has a spring projection 28 longitudinally-deflectable by energizing the solenoid 16. The gear tooth 24 is disposed and shaped to longitudinally retain the spring projection 28 when the spring projection 28 is longitudinally deflected against the latch gear 15 by energizing the solenoid 16 and when thereafter the drive shaft 20 is rotated in the reverse direction rotating the gear tooth 24 against the longitudinally-deflected spring projection 28. The gear tooth 24 longitudinally holds the longitudinally-retained spring projection 28 when the solenoid 16 and the electric motor 13 are deenergized. The gear tooth 24 is shaped to longitudinally release the longitudinally-retained spring projection 28 to a non-deflected state with the solenoid 16 deenergized when the drive shaft 20 is rotated in the forward direction rotating the gear tooth 24 away from the longitudinally-deflected spring projection 28. It is noted that any of the examples, variations, designs, modifications, of the third expression of the embodiment of FIGS. 1–6 are equally applicable to the fourth expression without the limitations of the electric motor 13 of the fourth expression having to be an EMB electric motor 12 and the latch gear 15 having to be a parking-brake latch gear 14.

Several benefits and advantages are derived from one or more of the expressions of an embodiment of the invention. Having a solenoid actuated latch gear eliminates the additional electric motor used to set the parking brake in conventional EMB motor assemblies.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. An electro-mechanical-brake (EMB) motor assembly comprising:

a) an EMB electric motor including a drive shaft with a longitudinal axis;

b) a parking-brake latch gear non-rotatably attached to the drive shaft and having a longitudinally extending gear tooth having a notch facing in a circumferential direction;

c) a solenoid; and d) a spring operatively connected to the solenoid and having a spring projection which is longitudinally-deflectable against the parking-brake latch gear by energizing the solenoid and which thereafter is retainable in the notch of the gear tooth of the parking-brake latch gear by rotating the parking-brake latch gear to receive the longitudinally-deflected spring projection in the notch , wherein the spring has a substantially annular disk shape, wherein the spring is coaxially aligned with the drive shaft, wherein the spring projection is one of a plurality of substantially-identical spring projections of the spring, and wherein the gear tooth is one of a plurality of substantially-identical gear teeth of the parking-brake latch gear.

2. The EMB motor assembly of claim 1, wherein the spring projections are radially-inwardly-facing spring projections, and wherein the notches face in the same circumferential direction.

3. The EMB motor assembly of claim 2, wherein the number of spring projections is equal to the number of gear teeth.

4. The EMB motor assembly of claim 3, wherein the EMB electric motor includes a motor housing supporting the EMB electric motor, and wherein the solenoid includes a solenoid housing non-rotatably attached to the motor housing.

5. The EMB motor assembly of claim 4, wherein the solenoid housing includes a plurality of tangs, wherein the spring includes a plurality of outer-circumferential cutouts, and wherein the tangs are disposed in the cutouts preventing rotation of the spring.

6. The EMB motor assembly of claim 1, wherein the EMB electric motor includes a motor housing supporting the EMB electric motor, and wherein the solenoid includes a solenoid housing non-rotatably attached to the motor housing.

7. The EMB motor assembly of claim 6, wherein the solenoid housing includes a plurality of tangs, wherein the spring includes a plurality of outer-circumferential cutouts, and wherein the tangs are disposed in the cutouts preventing rotation of the spring.

8. An electro-mechanical-brake (EMB) motor assembly comprising:

a) an EMB electric motor including a drive shaft with a longitudinal axis, wherein the EMB electric motor is rotatable in a brake-setting forward direction and is rotatable in a brake-releasing reverse direction;

b) a parking-brake latch gear non-rotatably attached to the drive shaft and having a gear tooth;

c) a solenoid; and d) a spring operatively connected to the solenoid and having a spring projection longitudinally-deflectable by energizing the solenoid, wherein the gear tooth is disposed and shaped to longitudinally retain the spring projection when the spring projection is longitudinally deflected against the parking-brake latch gear by energizing the solenoid and when thereafter the drive shaft is rotated in the reverse direction rotating the gear tooth against the longitudinally-deflected spring projection, wherein the gear tooth longitudinally holds the longitudinally-retained spring projection when the solenoid and the EMB electric motor are deenergized, wherein the gear tooth is shaped to longitudinally release the longitudinally-retained spring projection to a non-deflected state with the solenoid deenergized when the drive shaft is rotated in the forward direction rotating the gear tooth away from the longitudinally-deflected spring projection, wherein the spring has a substantially annular disk shape, wherein the spring is coaxially aligned with the drive shaft, wherein the spring projection is one of a plurality of substantially-identical spring projections of the spring, and wherein the gear tooth is one of a plurality of substantially-identical gear teeth of the parking-brake latch gear.

9. The EMB motor assembly of claim 8, wherein the spring projections are radially-inwardly-facing spring projections, and wherein the notches face in the same circumferential direction.

10. The EMB motor assembly of claim 9, wherein the number of spring projections is equal to the number of gear teeth.

11. The EMB motor assembly of claim 10, wherein the EMB electric motor includes a motor housing supporting the EMB electric motor, and wherein the solenoid includes a solenoid housing non-rotatably attached to the motor housing.

12. The EMB motor assembly of claim 11, wherein the solenoid housing includes a plurality of tangs, wherein the spring includes a plurality of outer-circumferential cutouts, and wherein the tangs are disposed in the cutouts preventing rotation of the spring.

13. The EMB motor assembly of claim 8, wherein the EMB electric motor includes a motor housing supporting the EMB electric motor, and wherein the solenoid includes a solenoid housing non-rotatably attached to the motor housing.

14. The EMB motor assembly of claim 13, wherein the solenoid housing includes a plurality of tangs, wherein the spring includes a plurality of outer-circumferential cutouts, and wherein the tangs are disposed in the cutouts preventing rotation of the spring.

15. A motor assembly comprising:

a) an electric motor including a drive shaft with a longitudinal axis;

b) a latch gear non-rotatably attached to the drive shaft and having a longitudinally extending gear tooth having a notch facing in a circumferential direction;

c) a solenoid; and d) a spring operatively connected to the solenoid and having a spring projection which is longitudinally-deflectable against the latch gear by energizing the solenoid and which thereafter is retainable in the notch of the gear tooth of the latch gear by rotating the latch gear to receive the longitudinally-deflected spring projection in the notch, wherein the spring has a substantially annular disk shape, wherein the spring is coaxially aligned with the drive shaft, wherein the spring projection is one of a plurality of substantially-identical spring projections of the spring, and wherein the gear tooth is one of a plurality of substantially-identical gear teeth of the latch gear.

16. A motor assembly comprising:

a) an electric motor including a drive shaft with a longitudinal axis, wherein the electric motor is rotatable in a forward direction and is rotatable in a reverse direction;

b) a latch gear non-rotatably attached to the drive shaft and having a gear tooth;

c) a solenoid; and d) a spring operatively connected to the solenoid and having a spring projection longitudinally-deflectable by energizing the solenoid, wherein the gear tooth is disposed and shaped to longitudinally retain the spring projection when the spring projection is longitudinally deflected against the latch gear by energizing the solenoid and when thereafter the drive shaft is rotated in the reverse direction rotating the gear tooth against the longitudinally-deflected spring projection, wherein the gear tooth longitudinally holds the longitudinally-retained spring projection when the solenoid and the motor are deenergized, wherein the gear tooth is shaped to longitudinally release the longitudinally-retained spring projection to a non-deflected state with the solenoid deenergized when the drive shaft is rotated in the forward direction rotating the gear tooth away from the longitudinally-deflected spring projection, wherein the spring has a substantially annular disk shape, wherein the spring is coaxially aligned with the drive shaft, wherein the spring projection is one of a plurality of substantially-identical spring projections of the spring, and wherein the gear tooth is one of a plurality of substantially-identical gear teeth of the latch gear.

* * * * *